(12) United States Patent
Henry et al.

(10) Patent No.: US 9,681,600 B2
(45) Date of Patent: Jun. 20, 2017

(54) SELECTIVE FAN SHAPED MATERIAL DISTRIBUTOR

(71) Applicant: CNH Industrial Canada, Ltd., Saskatoon (CA)

(72) Inventors: James W. Henry, Saskatoon (CA); Joel Gervais, Saskatoon (CA); Brennan Crooymans, Bow Island (CA); Joshua Cote, Saskatoon (CA); Joel Denis, Saskatoon (CA); Jonathan Schuba, Melfort (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/958,046

(22) Filed: Dec. 3, 2015

(65) Prior Publication Data

US 2016/0157419 A1    Jun. 9, 2016

Related U.S. Application Data

(60) Provisional application No. 62/086,889, filed on Dec. 3, 2014.

(51) Int. Cl.
*B65G 53/56*    (2006.01)
*A01C 7/08*     (2006.01)
*B65G 53/50*    (2006.01)

(52) U.S. Cl.
CPC .............. *A01C 7/084* (2013.01); *A01C 7/088* (2013.01); *B65G 53/50* (2013.01); *B65G 53/56* (2013.01)

(58) Field of Classification Search
CPC .................. B65G 53/56; A01C 7/084

USPC ........ 406/123, 131, 181, 183, 194; 209/143; 137/625.11; 111/175
See application file for complete search history.

(56) References Cited

U.S. PATENT DOCUMENTS

| | | | | |
|---|---|---|---|---|
| 1,792,983 | A | * | 2/1931 | Hull ........................ F16L 41/03 138/159 |
| 1,850,937 | A | * | 3/1932 | Messinger ............ B05B 7/1486 138/37 |
| 2,171,205 | A | * | 8/1939 | Zinke .................... A01M 9/003 222/312 |
| 3,490,654 | A | * | 1/1970 | Fischer .................. B65G 53/66 111/130 |
| 4,717,289 | A | * | 1/1988 | Popowich ................. B05B 1/14 111/175 |

(Continued)

*Primary Examiner* — Joseph Dillon, Jr.
(74) *Attorney, Agent, or Firm* — Rebecca L. Henkel; Rickard K. DeMille

(57) ABSTRACT

A material distribution system includes: a chassis; a material tank carried by the chassis and configured to hold a material; and a header configured to receive and distribute material from the material tank entrained in an air flow. The header includes: a header body having a pair of sidewalls, an inlet configured to receive entrained material from the material tank and a plurality of outlets, the sidewalls defining a width therebetween that increases from the inlet toward the plurality of outlets; a valve associated with an outlet that is configured to switch between a distributing position and a purging position, the valve blocking its outlet in the purging position; and a plenum having a volume of air that is selectively in fluid communication with the plurality of outlets to provide a purging air flow to the outlet with the associated valve when the valve is in the purging position.

7 Claims, 5 Drawing Sheets

(56) References Cited

U.S. PATENT DOCUMENTS

| | | | | | |
|---|---|---|---|---|---|
| 4,779,765 | A | * | 10/1988 | Neumeyer | A01C 7/06 111/174 |
| 5,156,102 | A | * | 10/1992 | Andersen | A01C 21/002 111/175 |
| 5,265,547 | A | * | 11/1993 | Daws | A01C 7/087 111/175 |
| 5,400,908 | A | * | 3/1995 | Prestwood | B07B 4/02 209/135 |
| 5,979,343 | A | * | 11/1999 | Gregor | A01C 7/081 111/175 |
| 6,263,883 | B1 | * | 7/2001 | Furmanski | A24C 5/323 131/282 |
| 7,223,060 | B2 | * | 5/2007 | Weidenmuller | B29C 35/16 406/159 |
| 8,635,963 | B2 | | 1/2014 | Friggstad | |
| 2006/0086844 | A1 | * | 4/2006 | DeHart | F16K 11/072 241/46.06 |
| 2008/0014032 | A1 | * | 1/2008 | Rillmann | B65D 88/28 406/87 |
| 2009/0165686 | A1 | * | 7/2009 | Memory | A01C 7/082 111/175 |
| 2011/0311322 | A1 | * | 12/2011 | Jost | A01C 7/082 406/181 |
| 2015/0246773 | A1 | * | 9/2015 | Sundholm | B65F 1/0093 406/1 |

* cited by examiner

SELECTIVE FAN SHAPED MATERIAL DISTRIBUTOR

CROSS REFERENCE TO RELATED APPLICATIONS

This is a non-provisional application based upon U.S. provisional patent application Ser. No. 62/086,889, entitled "SELECTIVE FAN SHAPED MATERIAL DISTRIBUTOR", filed Dec. 3, 2014, which is incorporated herein by reference.

BACKGROUND OF THE INVENTION

1. Field of the Invention

The present invention relates to material distributors, and, more particularly, to selective material distributors.

2. Description of the Related Art

Agricultural or farm implements that apply seed, fertilizer, or other particulate (granular) matter to a surface ("farm field") typically have one or more central hoppers or tanks that are loaded with the particulate matter. The hoppers have or are associated with a metering device, which is typically a rotating element, that meters the particulate matter from the hoppers into a set of distribution channels, such as conduits, hoses, etc., that are flow coupled to the individual row units, or seed boxes associated with the individual row units. In many implementations, a blower system provides a turbulent air stream into which the particulate matter is entrained to pass the particulate matter through the distribution channels and ultimately to the individual row units. Such air seeders can take many forms and use various configurations to apportion the correct amount of particulate matter evenly throughout the distribution channels so that the particulate matter is deposited onto the farm field in a uniform and consistent manner.

One type of air seeder uses a large conduit to convey all the metered product to a first hollow distributor or manifold at which the particulate product is divided into a number of secondary streams evenly using evenly sized and spaced outlet ports. The secondary streams are fed to secondary headers, with each secondary header providing additional division and distribution of the secondary streams before the air/product streams are fed to the individual row units.

Another type of air seeder uses a metering roller that is segmented into a number of sections, with each section of the metering roller communicating with a dedicated set of secondary headers. With this type of air seeder, the product is mechanically metered and separated into different streams or runs and each stream is fed to a secondary header that provides additional division and distribution of the air/product streams before being fed to the individual row units.

A third type of air seeder avoids the use of secondary headers and the downstream division that such secondary headers provide. These air seeders use a metering roller that is large enough to feed product to each of the row units directly.

Regardless of the type of air seeder used, due to the increasing cost of seed and fertilizer, the agronomic disadvantage and waste associated with redundant application of seed and fertilizer, and the increasing size of seed drills, efforts have been made to selectively shut off the flow of product to the secondary headers which allows the seed drill to traverse previously seeded land without necessarily reapplying seed or fertilizer while the seed drill is used to apply particulate matter to nearby unseeded land. For air seeders having segmented or direct feed metering rollers, sectional control can be achieved by preventing the flow of product to the metering roller. When starving the roller by mechanically stopping the flow of product by using a gate or similar structure or by not rotating the roller, the roller cannot meter product downstream.

It will thus be appreciated that achieving sectional control is relatively straightforward for air seeders having segmented or direct feed metering rollers. However, for an air seeder that uses a distribution manifold and several downstream secondary headers to distribute particulate matter to the individual row units, sectional control is considerably more difficult. That is, if air flow is stopped to one of the outlet ports of the main header or manifold, the downstream channel may become plugged by the residual product thereby causing an issue when the air flow through the stopped outlet port resumes. If the channel becomes plugged, the application devices that are fed by the plugged channel will not be able to apply product to the field and will result in inconsistent and undesirable application of the seed and/or fertilizer.

One known device that can overcome some of these problems is described in U.S. Pat. No. 8,635,963 to Friggstad. The material distributor described in Friggstad utilizes selectively operable valves to block outlets of a tower-type header from receiving material from a material tank or other source, at which point pressurized air can be blown into the outlet to evacuate any material that might still be in the outlet. While the device described in Friggstad is capable of accomplishing its intended purpose, material distributors with shapes other than towers could provide additional advantages.

What is needed in the art is a material distribution system that overcomes some of the disadvantages of prior art devices.

SUMMARY OF THE INVENTION

The present invention provides a fan shaped header with a plurality of outlets and a selectively operable valve associated with one or more of the outlets that controls whether entrained material from a material tank or pressurized air from a plenum is directed into the associated outlet.

The invention in one form is directed to a material distribution system including: a chassis; a material tank carried by the chassis and configured to hold a material; and a header configured to receive and distribute material from the material tank that is entrained in an air flow. The header includes: a header body having a pair of sidewalls, an inlet configured to receive entrained material from the material tank and a plurality of outlets, the sidewalls defining a width therebetween that increases in a direction from the inlet toward the plurality of outlets; a valve associated with at least one of the outlets that is configured to switch between a distributing position and a purging position, the valve blocking its associated outlet from receiving material from the material tank in the purging position; and a plenum having a volume of air that is selectively in fluid communication with the plurality of outlets and is configured to provide a purging air flow to the at least one outlet with the associated valve when the valve is in the purging position.

The invention in another form is directed to a material distribution system including: a chassis; a material tank carried by the chassis and configured to hold a material; and a header configured to receive and distribute material from the material tank that is entrained in an air flow. The header includes: a header body having a pair of sidewalls, an inlet configured to receive entrained material from the material tank and a plurality of outlets, the sidewalls defining a width therebetween that increases in a direction from the inlet toward the plurality of outlets; a valve associated with at least one of the outlets that is configured to switch between a distributing position and a blocking position, the valve blocking its associated outlet from receiving material from the material tank in the blocking position; and at least one adjustable vane configured to increase and decrease a flow width of material toward the plurality of outlets.

An advantage of the present invention is that the material distribution system does not need an impact plate to divide material, which can reduce damage to seeds.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
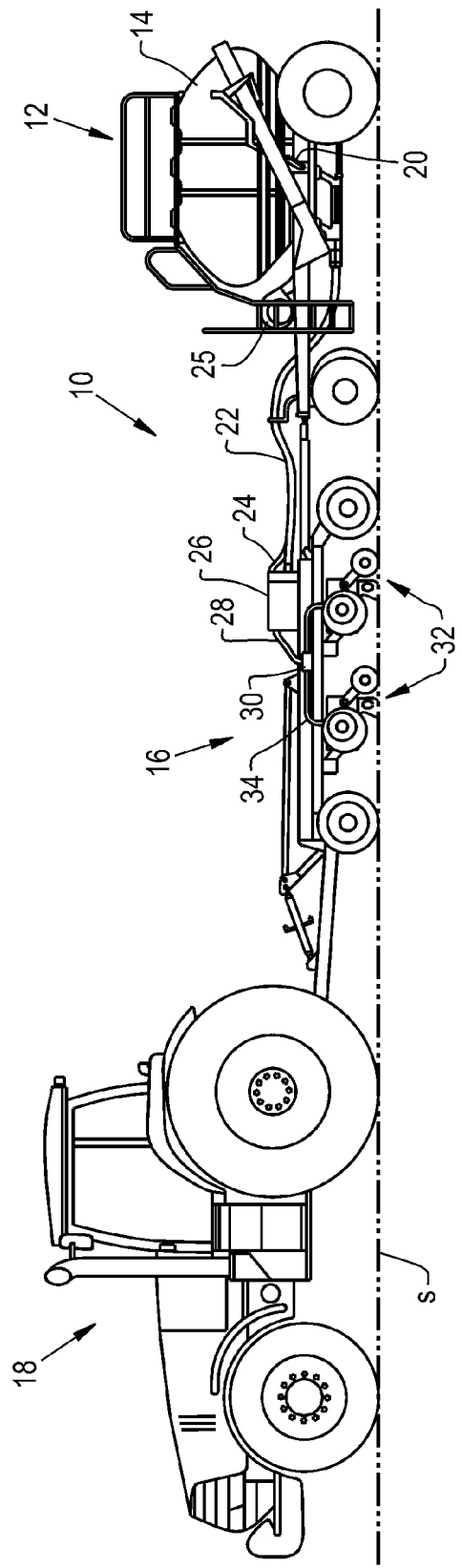
FIG. 1 is a perspective view of an embodiment of a material distribution system according to the present invention.

Referring now to the drawings, and more particularly to FIG. 1, there is shown an embodiment of a material distribution device 10 according to the present invention which generally includes a chassis 12, shown here as an air cart, carrying a material tank 14. As can be seen, the air cart 12 and material tank 14 are towed behind an air hoe drill 16, which is towed by a tractor 18 in a conventional manner. While the air cart 12 and air hoe drill 16 are shown as being towed behind tractor 18, they could also be pushed forward by the tractor 18 or carried together on a single chassis. The material tank 14 holds a quantity of one or more materials such as seed, fertilizer, herbicide, etc. that are to be spread on a surface S, shown as a field, by the air hoe drill 16. The material tank 14 can have more than one chamber formed within to hold different materials separate, and can be of any desired size and shape. A metering unit 20 can meter material from the material tank 14 to the air hoe drill 16 and can help control the rate at which material is distributed to the field S by the material distribution device 10, but is not necessary.

The air hoe drill 16 and air cart 12 can be interconnected by an air/material hose 22 and an air hose 24. Air can be supplied to both hoses 22, 24 by a blower assembly 25, which is shown as being mounted adjacent to the front of the material tank 14 and adjacent the metering unit 20 but can be mounted at any location on the material distribution device 10. Alternatively, each hose 22 and 24 could have its own separate supply of pressurized air. The blower assembly 25 creates a turbulent air flow that forces particulate material metered by the metering unit 20 into and along the air/material hose 22. The particulate material is entrained in the air flow created by the blower assembly 25 and communicated from the material tank 14, through the metering unit 20 and material/air hose 22 to a main header 26 that is carried by the air hoe drill 12. The main header 26 is represented as a rectangular block in FIG. 1 for ease of illustration and is shown in greater detail in FIGS. 2-7.

The main header 26 is fluidly coupled to material/air hose 22 so that the material/air mixture that passes through material/air hose 22 is delivered to the main header 26 and distributed by the main header 26 to primary hoses 28. The primary hoses 28 can be flow coupled to one or more secondary headers 30. The secondary headers 30 each connect to a row unit 32 via a secondary hose 34, with the row units 32 configured to deposit the particulate material to the field S in a known manner.

Referring now to FIGS. 2-7, an embodiment of the main header 26 according to the present invention is shown in greater detail. It should be appreciated that even though the main header 26 is shown in FIGS. 2-7, the secondary header(s) 30 could be structured in a similar fashion. The header 26 includes a header body 36 with a pair of sidewalls 38, an inlet 40 that receives entrained material from the material tank 14 via material/air hose 22, and multiple outlets 42 that connect to primary hoses 28 to distribute material to the secondary headers 30. As can be seen, the header body 36 has a width W defined between the sidewalls 38 that increases in a direction from the inlet 40 toward the outlets 42, giving the header body 36 a fan-like shape. The inlet 40 can be a circular shaped opening formed at a proximal end 44, relative to the material tank 14, of the header body 36 and the outlets 42 can have a circular shape and be aligned along a distal end 46 of the header body 36. The header body 36 can have more than one inlet, if desired. As can be seen, the header body 36 can have a circular cross-sectional shape adjacent to the proximal end 44 that gradually becomes a rectangular cross-sectional shape at the distal end 46, giving a flattened top surface 48 and bottom surface 50.

As shown in FIGS. 2-7, each outlet 42 has an associated valve 52 that is configured to switch between a distributing position and a purging position, which will be described further below. As used herein, "associated with" refers to a valve 52 being placed and configured in a way that allows the valve 52 to block the flow of material or purging air into its associated outlet 42. As shown, the valves 52 each include a gate 54 that is connected to an actuator 56, shown as a rod, with the gates 54 being hinged about valve openings 58 formed through the top surface 48 of the header body 36. Each gate 54 can be sized and shaped to completely cover the valve openings 58, so that material and air do not freely flow through the valve openings 58 when covered by the gate 54. The actuators 56 can be controlled to selectively switch the valves 52 between the distributing position and purging position by pushing or pulling the gates 54 into the desired position.

The header 26 further includes a plenum 60 that is selectively in fluid communication with the outlets 42. As can be seen, the plenum 60 has a body attached to the top surface 48 of the header body 36 that encloses a volume, which can be filled with purging air from the blower assembly 25 or a different air source. The plenum 60 can have air inlets 62 formed through that connect to air hoses 24 to supply purging air to the plenum 60 from the blower assembly 25. Optionally, a valve (not shown) can be placed within one or both air inlets 62 to selectively control when purging air is supplied to the plenum 60 from the blower assembly 25. The size and shape of the plenum 60 can be chosen to provide varying purging air flow patterns and pressures out of the plenum 60. It should be appreciated that while the plenum 60 is shown attached to the top surface 48 of the header body 36, the plenum 60 can be placed at any location that allows for the plenum 60 to be in selective fluid communication with the outlets 42.

Figure 3:
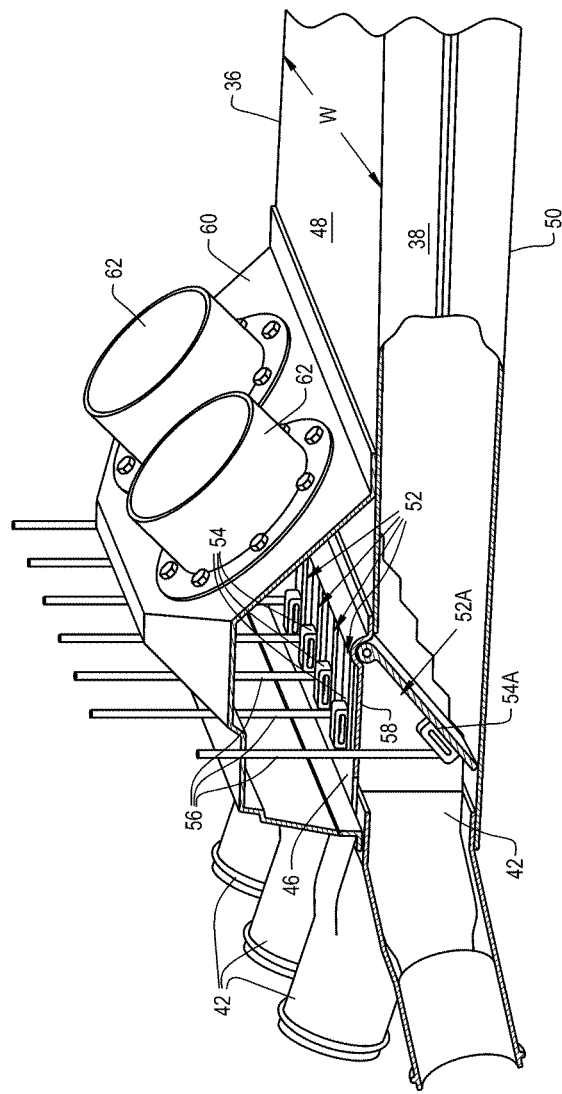
FIG. 3 is another perspective view of the header shown in FIG. 2 with portions cut away.

As can be seen in FIG. 3, purging air within the plenum 60 is kept isolated from an outlet 42 when the outlet's 42 associated valve's 52 gate 54 completely covers its respective valve opening 58. In this position, which is referred to as the distributing position, the valve 52 allows entrained material supplied to the header body 36 from the material/air hose 22 to be directed into the valve's 52 associated outlet 42 and be distributed to a secondary header 30 through a primary hose 28. Each valve 52 also has a purging position, illustrated by valve 52A in FIG. 3, that allows purging air flow from the plenum 60 to be directed into the valve's 52A associated outlet 42 by gate 54A, which simultaneously blocks entrained material from being directed into the associated outlet 42. When the valve 52A is in the purging position, the plenum 60 is in fluid communication with the valve's 52A associated outlet 42 and a purging air flow can be directed into the outlet 42 to clear material that is held within the primary hose 28 connected to the outlet 42. Such a configuration allows for the distribution of material from the header 26 to be selectively controlled by controlling the actuators 56 to adjust which valves 52 are in the distributing position and which valve(s) 52A are in the purging position. As one or more of the valves 52 is placed in the purging position, the metering unit 20 can be concurrently adjusted so that the material flow rate through the outlets 42 with valves 52 in the distributing position remains constant. It should also be appreciated that the purging air supply to the plenum 60 from the blower system 25 can be selectively shut-off when material has been purged from a primary hose 28 in fluid communication with the plenum 60.

Figure 2:
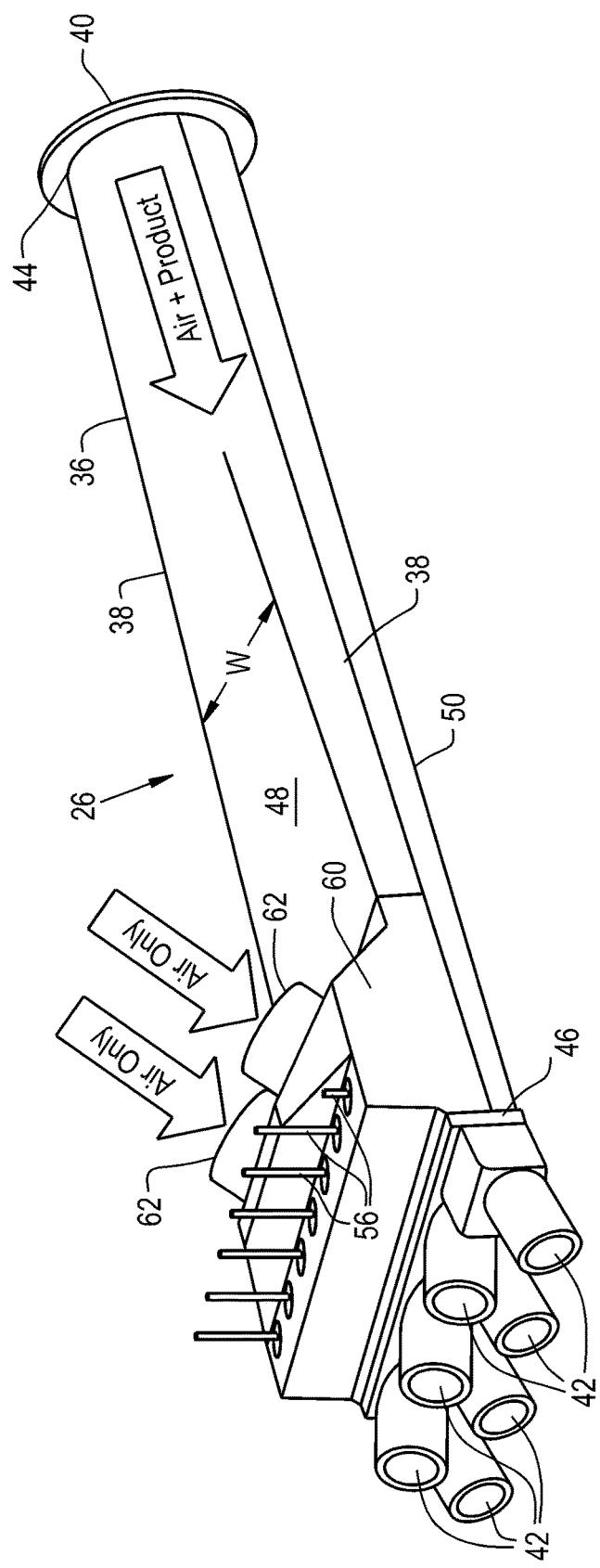
FIG. 2 is a perspective view of an embodiment of a header according to the present invention.
Figure 5:
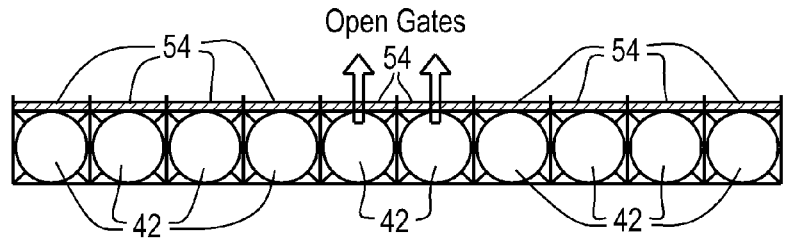
FIG. 5 is a cross-sectional view of the header shown in FIG. 4 taken along line 5-5.
Figure 4:
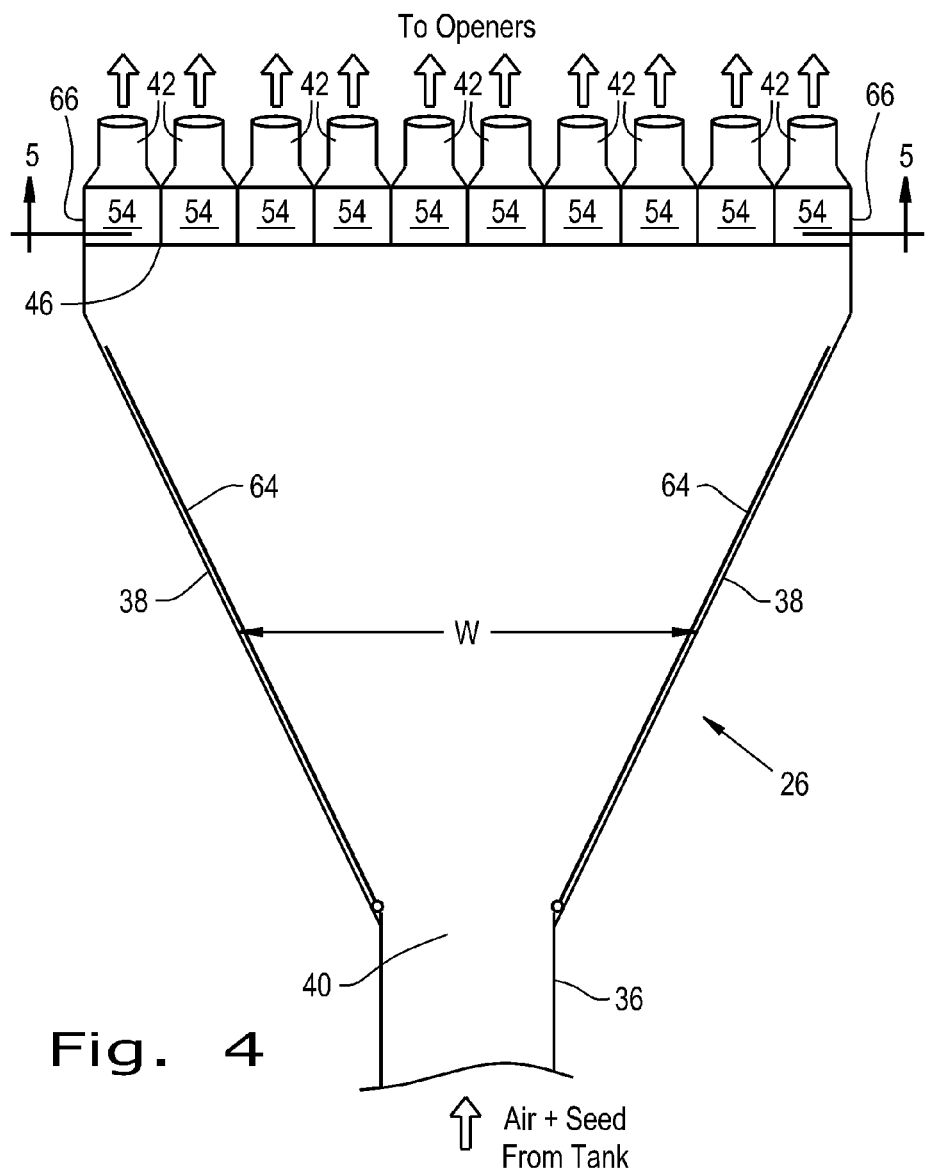
FIG. 4 is a plan view of another embodiment of a header according to the present invention with vanes in a completely open position.
Figure 7:
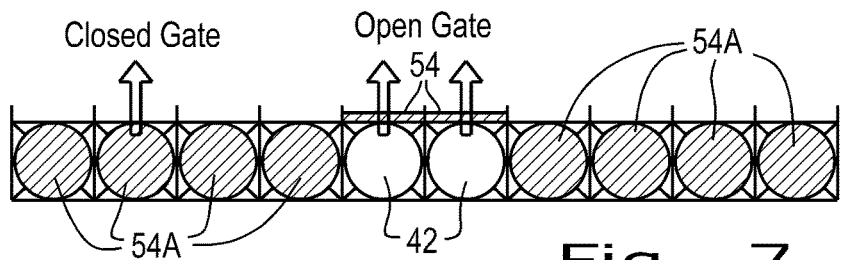
FIG. 7 is a cross-sectional view of the header shown in FIG. 6 taken along line 7-7.
Figure 6:
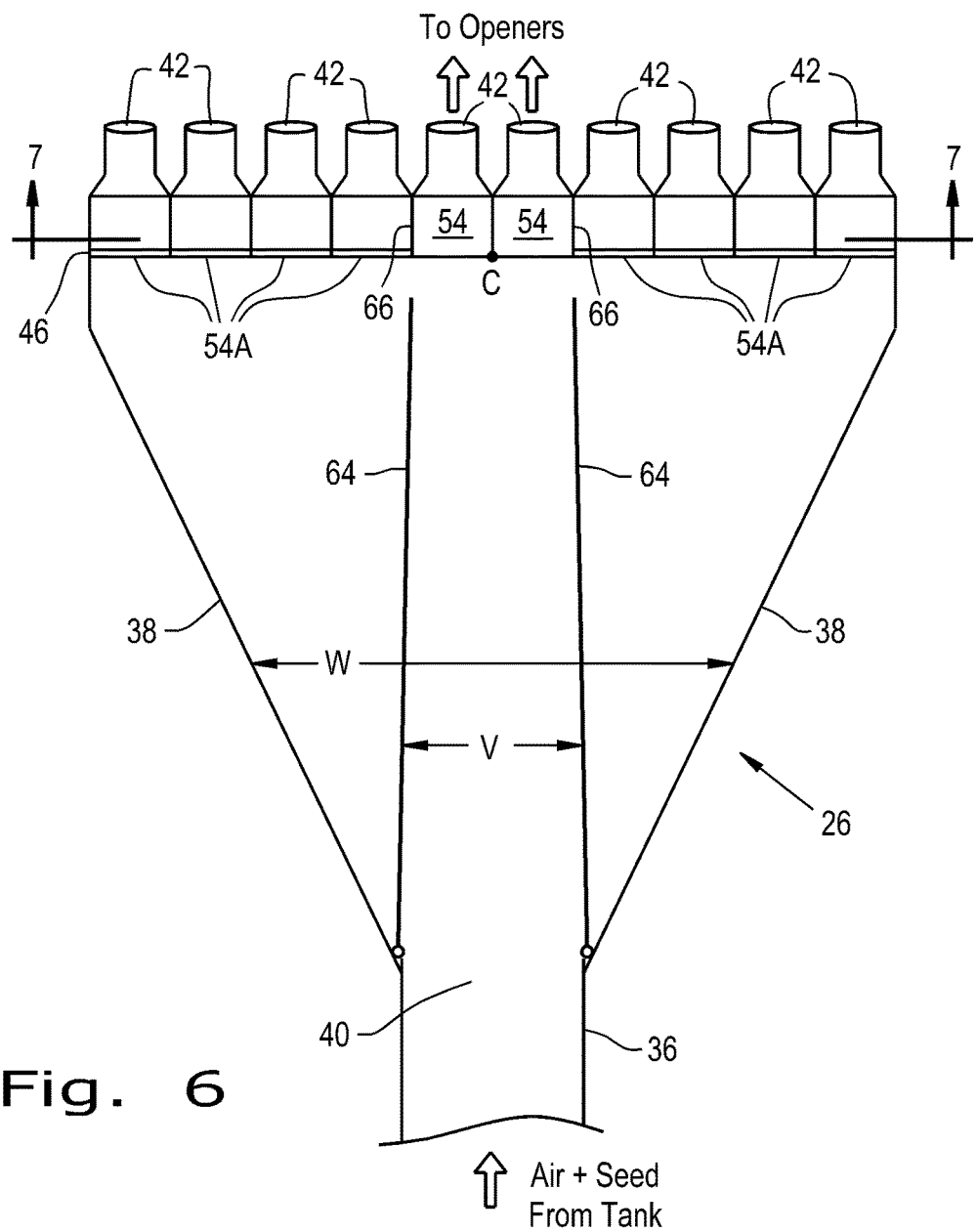
FIG. 6 is a plan view of the header shown in FIGS. 4-5 with vanes of the header in a flow constraining position.

Referring now to FIGS. 4-7, the header 26 shown in FIGS. 2-3 is shown with a pair of adjustable vanes 64 held within the header body 36. As can be seen in FIGS. 4-5, the vanes 64 are held against the sidewalls 38 so that the flow width of entrained material through the header body 36 is essentially the same as the width W of the header body 36. Since the vanes 64 cannot extend through the sidewalls 38, the positioning of the vanes shown in FIG. 4 defines a maximum flow width that is approximately the same as the width W of the header body 36, with the maximum flow width being slightly smaller than the width W of the header body 36 to account for possible clearances formed between the vanes 64 and sidewalls 38 as well as the thickness of the vanes 64. When the vanes 64 are in this position, entrained material is allowed to fan out as it flows through the header body 36 and evenly distribute to the outlets 42 at the distal end 46 of the header body 36. Such a position of the vanes 64 can correspond to all of the outlets 42 having an associated valve 52 in the distributing position, so that any material directed toward an outlet 42 will be directed into a primary hose 28 toward a secondary header 30. When some of the outlets 42 have associated valves 52A in the purging position so that gates 54A are blocking entrained material flow from the material/air hose 22 into the outlets 42, as shown in FIGS. 6-7, the vanes 64 can be adjusted so that a flow width of entrained material through the header body 36 is constrained to a flow width V defined between the vanes 64. The flow width V of the vanes 64 can be selectively controlled to correspond to which outlets 42 have associated valves 52 in the distributing position, so that entrained material is selectively directed toward outlets 42 that are open. In this sense, each vane 64 can be positioned so that it is aligned with an outer side 66 of one or more open outlets to limit the amount of entrained material that is directed toward a closed outlet. In such a configuration, the valves 52 can be switched from the distributing position to the purging position sequentially along the width W in a direction from the sidewalls 38 toward a center C of the distal end 46 so that the flow width V is directed at open outlets. It should be appreciated that while two vanes 64 are shown, the flow width V could be adjusted by a single vane 64 as well, in which case the flow width V would be the distance between the single vane 64 and one of the sidewalls 38. It is contemplated that when one or more vanes 64 is included in the header 26, the plenum 60 could be an optional feature to purge the primary hoses 28 connected to the outlets 42. If the header 26 does not include a plenum, the positioning of the valves 52 that is referred to as "a purging position" can be referred to as "a blocking position," since the valves 52 block entrained material from being directed into the outlets 42 without directing purging air flow into the outlets 42.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A material distribution system, comprising:
   a chassis;
   a material tank carried by said chassis and configured to hold a material; and
   a header configured to receive and distribute material from said material tank that is entrained in an air flow, said header including:
      a header body having a pair of sidewalls, an inlet configured to receive entrained material from said material tank and a plurality of outlets, said sidewalls defining a width therebetween that increases in a direction from said inlet toward said plurality of outlets;
      a valve associated with at least one of said plurality of outlets, said valve being configured to switch between a distributing position and a purging position, said valve blocking its associated outlet from receiving material from said material tank in said purging position; and
      at least one adjustable vane configured to increase and decrease a flow width of material toward said plurality of outlets.

2. The material distribution system of claim 1, wherein said at least one adjustable vane comprises a pair of adjustable vanes.

3. The material distribution system of claim 2, wherein said flow width is defined between said pair of adjustable vanes.

4. The material distribution system of claim 3, wherein a maximum flow width between said pair of adjustable vanes is approximately equal to said width of said header.

5. The material distribution system of claim 1, wherein said at least one adjustable vane is configured to selectively direct material from said material tank toward selected outlets of said plurality of outlets.

6. The material distribution system of claim 2, wherein said pair of adjustable vanes are configured to increase and decrease a flow width of material toward said plurality of outlets.

7. The material distribution system of claim 6, wherein said pair of adjustable vanes is configured to increase and decrease the flow width of material based on which of said plurality of outlets have an associated valve in said distributing position.

\* \* \* \* \*